Dec. 24, 1957  F. FRANZ  2,817,208
ELECTRIC METRONOME
Filed Aug. 16, 1954  2 Sheets-Sheet 1

INVENTOR
Frederick Franz
BY
ATTORNEYS

Dec. 24, 1957 F. FRANZ 2,817,208
ELECTRIC METRONOME
Filed Aug. 16, 1954 2 Sheets-Sheet 2
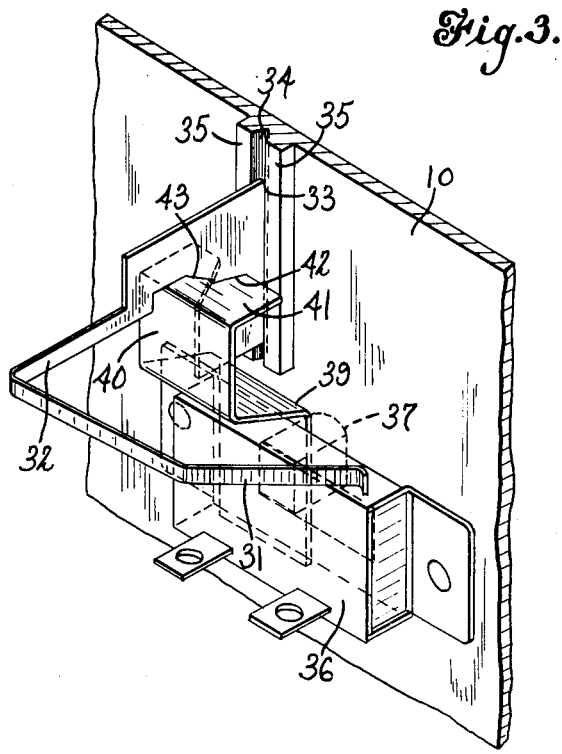
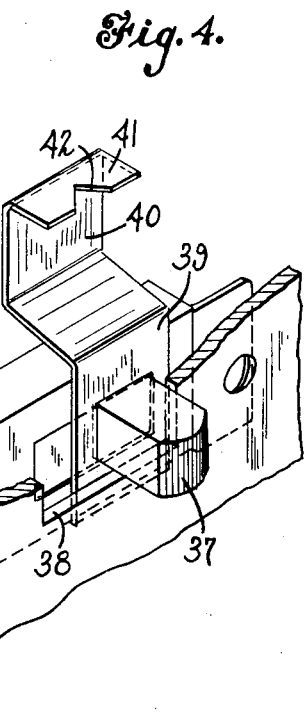
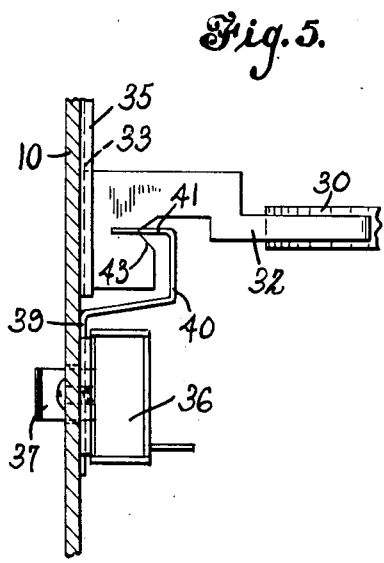
INVENTOR.
Frederick Franz
BY
ATTORNEYS

United States Patent Office 2,817,208
Patented Dec. 24, 1957

2,817,208

ELECTRIC METRONOME

Frederick Franz, West Haven, Conn.

Application August 16, 1954, Serial No. 450,198

2 Claims. (Cl. 58—130)

This invention relates to metronomes and more particularly to an electric metronome of the general type illustrated in my prior Patent No. 2,150,967, issued March 21, 1939. As illustrated in the present drawings and also in my prior patent, the structure employs a striking mechanism actuated by a rotatable driven member, generally of disk-like form, this driven member being actuated by a driving member of generally cone-shaped form, which is carried by the rotor of a synchronous electric motor.

For various reasons it has been found to be both economical and practical to use an electric clock type motor as these are produced in quantity and possess sufficient power to operate the rotatable driven member referred to which in turn actuates the striking mechanism. However, these motors have a relatively low torque value and, as they are usually made in quantity, this torque value sometimes varies in a substantial amount. Therefore, in some instances difficulty has been countered in that the driving torque of the motor is not sufficient to start the mechanism of the metronome and overcome the inertia of the parts although the torque of the motor may be quite sufficient to drive the mechanism of the metronome after it has been started.

Also in an electrically driven metronome the inertia of the rotor of the motor and also of the mechanism of the metronome is sufficiently great so that after the current to the motor has been interrupted the parts will not come to an immediate stop but will continue a short time and slowly come to a stop. This is somewhat objectionable in that it is more desirable to have the mechanism of the metronome begin at full speed or substantially full speed immediately when the current is turned on and also that it come to an instant stop when the current to the driving motor is interrupted.

It is contemplated by the present invention to overcome the disadvantages above referred to and provide mechanism which will function in such a manner that the mechanism will be given an initial rotating impulse or "kick" when the switch is actuated to energize the motor and also so that a braking force will be applied to the moving parts when the motor is deenergized. This starting impulse imparted to the motor will overcome the inertia of the mechanism so that it will always start when the current is turned on even though the torque of the motor might be so weak that it would not overcome the inertia of the parts even though it will be sufficient to drive the mechanism after it is once started.

Moreover, the arrangement is such that the element which engages a part on the motor shaft and imparts this starting impulse to the latter is the same element which, when the switch is moved to cut off the current to the motor, will engage the same part upon the rotor shaft and apply a braking action to bring the mechanism to an instant stop.

One object of the present invention is to provide an improved starting and stopping mechanism for an electric metronome.

A still further object of the invention is to provide a driving mechanism for a metronome comprising a driving member and a driven member, the striker of the metronome being actuated by the latter, and means for imparting a starting impulse to one of said members upon the initiation of the delivery of electric current to the motor which actuates the driving member.

Still another object of the invention is to provide means for applying a braking action to the moving parts of an electric metronome when the driving motor is deenergized so that upon deenergization of the motor the mechanism will come to an instant stop.

Still another object of the invention is to provide an electrically driven metronome having a manually-operated switch member to control the delivery of current to the electric motor with means attached to said switch element and moved thereby to impart a rotating impulse to the rotor of the motor to provide for quick starting of the latter and to provide for the movement of the same means to a position to engage a part on the rotor to bring the latter to an instant stop when the current to the motor is cut off.

To these and other ends the invention consists in the novel features and combinations of parts to be hereinafter described and claimed.

In the accompanying drawings:

Fig. 3 is a perspective view of the mechanism for starting and stopping the rotor of the motor upon actuation of the motor-controlling switch;

Fig. 4 is a perspective view of certain of the parts shown in Fig. 3, viewing these parts from the other side with respect to that shown in Fig. 3; and Fig. 5 is a detail sectional view on line 5—5 of Fig. 1.

Figure 1:
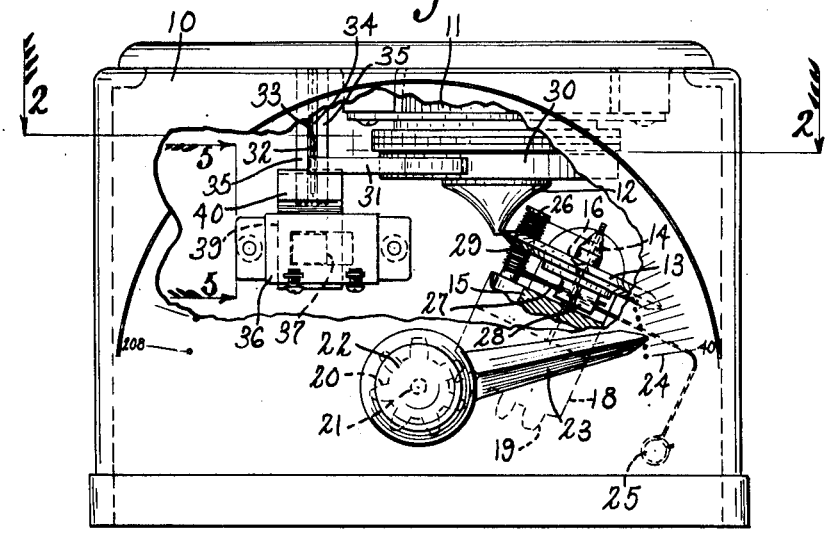
Fig. 1 is a side elevational view of an electric metronome embodying my invention, some parts being broken away to show the interior mechanism.

To illustrate a preferred embodiment of my invention I have shown an electric metronome comprising a casing or frame 10 within which is mounted an electric motor shown conventionally at 11. As illustrated the motor shaft is vertically disposed, and upon its lower end is mounted a substantially cone-shaped driving member 12. The surface of this member is not precisely cone-shaped but the elements of the surface are curved rather than straight lines, and in this case follow the arc of a circle drawn about a center which is substantially the center of a driven disk 13.

This driven disk is rotatably mounted upon a shaft 14, this shaft being carried by a frame or supporting member 15 rockably mounted upon pivots 16 and 17 in the opposite walls of the casing 10. Thus the driven disk 13 is mounted to tilt or swing about an axis joining the pivots 16 and 17, which axis passes through substantially the center of the disk so as to vary the point of contact of the disk with the surface of the driving member and thus vary the speed of rotation of the disk relatively to the driving member. It will be obvious that when the disk 13 contacts the smaller end of the driving member, its rotational speed will be less than when it is in contact with the upper portion of the driving member which is of larger diameter.

At one end the frame member 15 is provided with a depending portion 18 having teeth 19 upon its lower edge which teeth are engaged by those of a pinion 20 secured to a shaft 21 rotatably mounted in the walls of the casing. The shaft 21 will be rotated by the manually engageable knob 22 and a pointer 23 secured to the member 22 is adapted to cooperate with a scale 24 (Fig. 1) on the out-side of the casing. With this construction it will be apparent that when the knob 22 is rotated the frame member 15 will be tilted about its pivots 16 and 17 annd vary the point of contact between the driving and driven members 12 and 13 which in turn will vary the rate of beats of the metronome and that this rate will be correctly indicated by the pointer 23 upon the scale 24.

Also mounted on the frame or cradle member 15 is a striker 25 pivoted upon the post 26, one arm 27 of this striker being engaged by a cam member 28 secured to the driven disk 13 so that the striker will be moved away from the casing wall and then permitted to strike the wall or an anvil positioned thereon once every revolution of the cam. A spring 29 upon the post 26 engages the arm 27 of the striker and maintains it in engagement with the cam 28 and also urges the striker toward the wall of the casing.

Also secured to the motor shaft is a drum 30, which, as illustrated, is a part of the rotor, and this drum is adapted to be engaged by the arm 31 of a kicker or pusher member 32 having one end pivoted to the wall of the case at 33 by having its edge received in a V-shaped slot 34 provided between ribs 35 formed integrally with the case (Fig. 3). It will be understood that this kicker member is of light sheet metal so that it is resilient and its end 31 which contacts the drum 30 may readily flex so as to frictionally engage the drum while at the same time permit pivoting of the kicker member as will be hereinafter explained.

The current to the motor is controlled by an electric switch of any usual type, this switch being shown diagrammatically as being located in the switch box 36 and the switch is actuated to "on" and "off" position by the manually reciprocable member 37 which extends outwardly through an opening 38 in the wall of the casing 10. Secured to the member 37 is an actuating member 39 which is moved thereby, this member having a U-shaped portion 40 having an inturned end 41 provided with a V-shaped notch 42. This V-shaped notch is engaged with a similar notch 43 provided in the portion 32 of the kicker member to hold the edge of the kicker member in the slot 34, and swing it about its pivot to position in which the arm 31 engages and disengages the drum member 30.

As will be apparent from Figs. 2 to 5, when the switch-actuating member 37 is moved slidably in one direction or another within the opening 38, the kicker member 32 will be swung about its pivot in the groove 34 by reason of the connection of the member 40 therewith. This will swing the kicker member between the full- and dotted-line positions shown in Fig. 2. In the full-line position shown in this figure, the end 31 of the kicker member engages the drum 30 and exerts a braking action thereon, holding the drum and the rotor shaft against movement or causing the rotation of the rotor to stop if the engagement is made during the rotation of the latter. When the kicker member is moved from the full-line to the dotted-line position shown in Fig. 2, it not only moves the arm 31 away from the drum 30 so as to permit rotation of the rotor, but also imparts a starting torque or rotating impulse to the drum 30 so as to initiate rotation of the motor shaft and the driving member 12.

Figure 2:
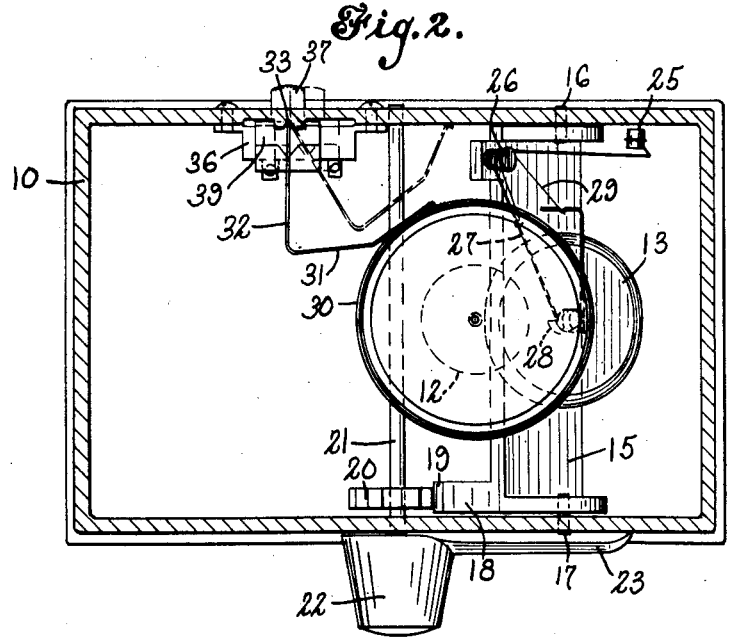
Fig. 2 is a plan sectional view on line 2—2 of Fig. 1.

When the switch member is in the position shown in full lines in Fig. 2, the motor is deenergized and the parts are at rest. When, however, the switch member 37 is moved slidably to the dotted-line position shown in Fig. 2, the switch will be closed and current will be supplied to the motor 11. Upon movement of the switch member to the dotted-line position, the arm 31 of the kicker member will impart the rotating impulse to the rotor shaft so that the mechanism will immediately begin operation. When it is desired to discontinue the use of the device, the switch member 37 will be moved back to its full-line position, thus moving the arm 31 of the kicker member into engagement with the drum 30 which will immediately cause the rotor and other parts of the moving mechanism to stop. Thus the beats will be immediately discontinued and will not slowly die out as would be the case if the parts continued to move due to their inertia.

While I have shown and described a preferred embodiment of my invention, it will be understood that it is not to be limited to all of the details shown, but is capable of modification and variation within the spirit of the invention and within the scope of the claims.

What I claim is:

1. An electric metronome comprising a frame, a motor supported by the frame having a rotor, a driving member carried by the rotor, a driven member rotatably supported by the frame in position to be engaged and driven by the driving member, a striker actuated by the driven member, a switch-actuating element slidably mounted on the frame to control the supply of current to the motor, said switch being movable to "off" and "on" positions, and means to impart a starting impulse to one of said members to initiate movement of the striker at a normal rate when the switch is moved to "on" position and to stop movement of the striker instantly upon actuation of the switch to "off" position, said means comprising a kicker element pivotally attached to the frame and adapted to engage one of said members, and means connecting said switch-actuating element to said kicker element to move the latter into engagement with said one member and stop the same when said switch is moved to "off" position and to give a starting impulse to said one member when the switch is moved to "on" position.

2. An electric metronome comprising a frame, a motor supported by the frame having a rotor, a driving member carried by the rotor, a driven member rotatably supported by the frame in position to be engaged and driven by the driving member, a striker actuated by the driven member, a switch element movably mounted on the frame to control the supply of current to the motor, a kicker member pivotally attached to the frame and provided with a resilient arm to engage a part of the driving member, means connecting said switch element to said kicker member to move it to position to disengage said part and mechanically impart a rotating impulse thereto when the switch element is moved in one direction, said frame comprising a casing wall having a slot therein, said kicker member being pivotally connected to said wall and having its edge received in said slot, and said means connecting the switch element to the kicker member serving to hold the edge of the kicker member in said slot.

References Cited in the file of this patent

UNITED STATES PATENTS

| 2,058,712 | Muir et al. | Oct. 27, 1936 |
| 2,150,967 | Franz | Mar. 21, 1939 |
| 2,372,771 | Drescher | Apr. 3, 1945 |

FOREIGN PATENTS

| 372,478 | Great Britain | May 4, 1932 |